United States Patent [19]

Avard et al.

[11] Patent Number: 4,890,851
[45] Date of Patent: Jan. 2, 1990

[54] BELLOWS SEAL WITH VIBRATION DAMPER

[75] Inventors: Louis H. Avard, Lawton; Harry L. Mason, Kalamazoo, both of Mich.

[73] Assignee: Durametallic Corporation, Kalamazoo, Mich.

[21] Appl. No.: 300,475

[22] Filed: Jan. 19, 1989

[51] Int. Cl.⁴ .............................................. F16J 15/38
[52] U.S. Cl. ..................................... 277/89; 277/81 R; 277/96.1; 277/DIG. 9
[58] Field of Search ................ 277/DIG. 9, 89, 81 R, 277/88, 198, 81 S, 96.1

[56] References Cited

U.S. PATENT DOCUMENTS

| | | | |
|---|---|---|---|
| 2,463,695 | 3/1949 | Jensen | 277/89 |
| 3,372,939 | 3/1968 | Coulombe et al. | 277/88 |
| 3,773,337 | 11/1973 | Adams | 277/89 |
| 4,261,581 | 4/1981 | Hershey | 277/89 |
| 4,659,092 | 4/1987 | Wallace et al. | 277/38 |

FOREIGN PATENT DOCUMENTS

| | | | |
|---|---|---|---|
| 134370 | 9/1949 | Australia | 277/89 |
| 1076314 | 10/1954 | France | 277/89 |
| 58-39882 | 3/1983 | Japan | 277/81 R |

*Primary Examiner*—Allan N. Shoap
*Assistant Examiner*—Jeffrey J. Hohenshell
*Attorney, Agent, or Firm*—Flynn, Thiel, Boutell & Tanis

[57] ABSTRACT

A bellows-type mechanical seal construction having a rotating carbide face ring provided with a vibration damper mounted thereon. The vibration damper comprises a carbon ring which is fixedly mounted within the carbide face ring, as by a press fit. The carbon vibration dampener ring is of substantial axial extent, and provides a close clearance with a shaft to effectively dampen vibrations of the rotating seal parts.

5 Claims, 1 Drawing Sheet

BELLOWS SEAL WITH VIBRATION DAMPER

FIELD OF THE INVENTION

This invention relates to a mechanical seal construction, and particularly a bellows-type seal construction provided with a vibration damper for cooperation between the shaft and surrounding seal ring.

BACKGROUND OF THE INVENTION

U.S. Pat. No. 4,261,581, assigned to Durametallic Corporation, discloses a mechanical seal construction employing a pair of opposed face rings which are disposed in relatively rotatable and sliding sealing engagement with one another. One face ring is fixedly related relative to a surrounding housing, and the other surrounds and is nonrotatably mounted relative to a rotating shaft. The rotating face ring is typically spaced radially outwardly from the shaft to define a substantial annular clearance space therebetween, and this face ring is coupled to one end of an axially elongate bellows which surrounds the shaft and at its other end is coupled to a collar which is fixedly and sealingly coupled to the shaft. This known mechanical seal construction is widely and successfully utilized in many environments, such as the chemical and petrochemical industries, requiring a sealing relationship for confining fluids, particularly corrosive and/or high-temperature fluids.

In the known and extensively utilized mechanical seal construction described above, the face rings are normally and preferably constructed of a carbide material, generally either silicon carbide or tungsten carbide, so as to both withstand the desired operating conditions and provide a desirable seal life. However, due to the extreme hardness of such carbide face rings, they have necessarily been maintained in substantial radially spaced relationship from the shaft so as to prevent contact therebetween due to the mechanical vibration which exists in the conventional mechanical seal environment, which vibration between the face rings and the shaft occurs in numerous forms and modes, including axial, radial and torsional vibrations.

Since such mechanical vibrations have long created problems with respect to wear and durability of mechanical seals, particularly those constructions involving metal bellows, seal designers have attempted to utilize various structural modifications in the seal construction so as to more closely control and confine the rotating seal parts relative to the shaft to prevent wear or failure due to such vibration. In one commonly and long utilized construction, the support ring for the rotating face ring is provided with several (normally three) tabs formed integrally thereon and projecting radially thereof so as to create a very close fit with the shaft, the clearance between these tabs and the shaft typically being a few thousands of an inch. These tabs and their close clearance with the shaft are intended to provide a much closer confinement, at least radially, of the rotating seal parts relative to the shaft, and hopefully minimize vibration. The Assignee's experience with this type of vibration dampening technique, however, through both field experience and laboratory testing, indicates that this vibration dampening construction creates more problems than it solves. For example, fretting damage between the shaft and the vibration dampening tabs occurs due to misalignment of the seal faces with respect to the shaft axis. Forced vibration of the support ring back and forth (that is, axially) also frequently results in fretting damage to the pump shaft. This damage and the adverse loads imposed on the support ring may be great enough to cause face separation, undesirably high leakage rates, or even hang up of the bellows. Close clearances of the vibration dampener tabs with the shaft also make the seal construction susceptible to hang up due to crystals or solids forming on the atmospheric side of the seal or thermal expansion of the shaft inside the vibration dampener tabs. Thus, this type of vibration dampening structure is, in many use situations, undesirable or unacceptable.

In an attempt to overcome the fretting and hang up problems caused by a vibration damper of the aforementioned type, mechanical seal constructions have also used a vibration damper constructed of a plastics or elastomeric material. Such vibration damper is generally comprised of a ring member which is axially rather thin, and which is fixedly clampingly held between the rotating face ring and its support ring. This elastomeric dampener ring projects radially inwardly so as to create a close fit with the shaft. While this elastomeric dampener ring obviously eliminates the fretting problem, nevertheless it has been observed to create other operational problems. For example, this elastomeric dampener has been observed to hang up on the shaft and thus effectively act as a seal, thereby interfering with proper operation of the mechanical seal construction. The elastomeric dampener also undergoes deterioration, particularly in view of the highly corrosive or high temperature fluids with which seals of this type are commonly used, and in addition the known dampeners have been of very short axial extent and accordingly have performed with only limited success.

In a very small number of use conditions, a mechanical seal construction in provided with carbon face rings rather than carbide face rings. Such carbon face rings are typically not used since they have a very short operational wear life. However, in situations where they are used, they have been constructed so as to have an inside diameter which provides only a minimal clearance relative to the shaft to minimize the vibration problem. While such a carbon face ring has been observed to operate in a satisfactory manner with respect to minimizing vibration problems, nevertheless such is not a fair evaluation of the overall seal construction performance, including an evaluation of the vibration problem, since such carbon face ring itself exhibits a very poor life cycle, such that the vibration problem itself may no longer be of primary concern.

Accordingly, it is an object of this invention to provide an improved bellows-type mechanical seal construction employing carbide face rings, which seal construction overcomes many of the above-mentioned disadvantages and operational problems.

In the improved bellows-type mechanical seal construction of this invention, the rotating carbide face ring has a vibration damper mounted thereon, the latter preferably being constructed as a carbon ring which is fixedly mounted within the carbide face ring, preferably by means of a press fit. The carbon vibration dampener ring is of substantial axial extent, and provides a close clearance with the shaft to effectively dampen vibrations of the rotating seal parts while at the same time avoiding damage to or hang up on the shaft.

In the improved seal construction, as briefly summarized above, the carbon dampener ring preferably has an axially length which is somewhat shorter then the axial length of the carbide face ring, the latter being supportingly positioned so that it has a nose part which projects axially beyond the carbon dampener ring, with this nose part defining thereon a seal face which slidingly contacts an opposed seal face on the stationary face ring. This arrangement thus prevents build up of coke and debris in or directly adjacent the plane of the seal face.

With the improved seal construction of this invention, a bellows-type seal is able to retain use of carbide face rings so as to provide optimum life, and at the same time the face ring can be desirably closely and concentrically supported relative to the shaft by means of the intermediate carbon dampener ring so as to effectively dampen vibrations and minimize problems caused by such vibration, and at the same time the carbon dampener ring effectively provides a long and concentric area for supporting engagement with the shaft, which engagement area is effectively self lubricating and does not create any fretting of the shaft or hang up of the seal parts. At the same time, the carbon ring is able to maintain the desirable and necessary minimal clearance between the carbon dampener ring and the shaft so as to not create a total seal at this point, and still permit the necessary floating movement (both radial and angular float) of the face ring as required in order to achieve optimum seal performance.

Other structural features, objects and purposes of the invention will be apparent to persons familiar with seal constructions of this general type upon reading the following specification and inspecting the accompanying drawings.

Figure 1:
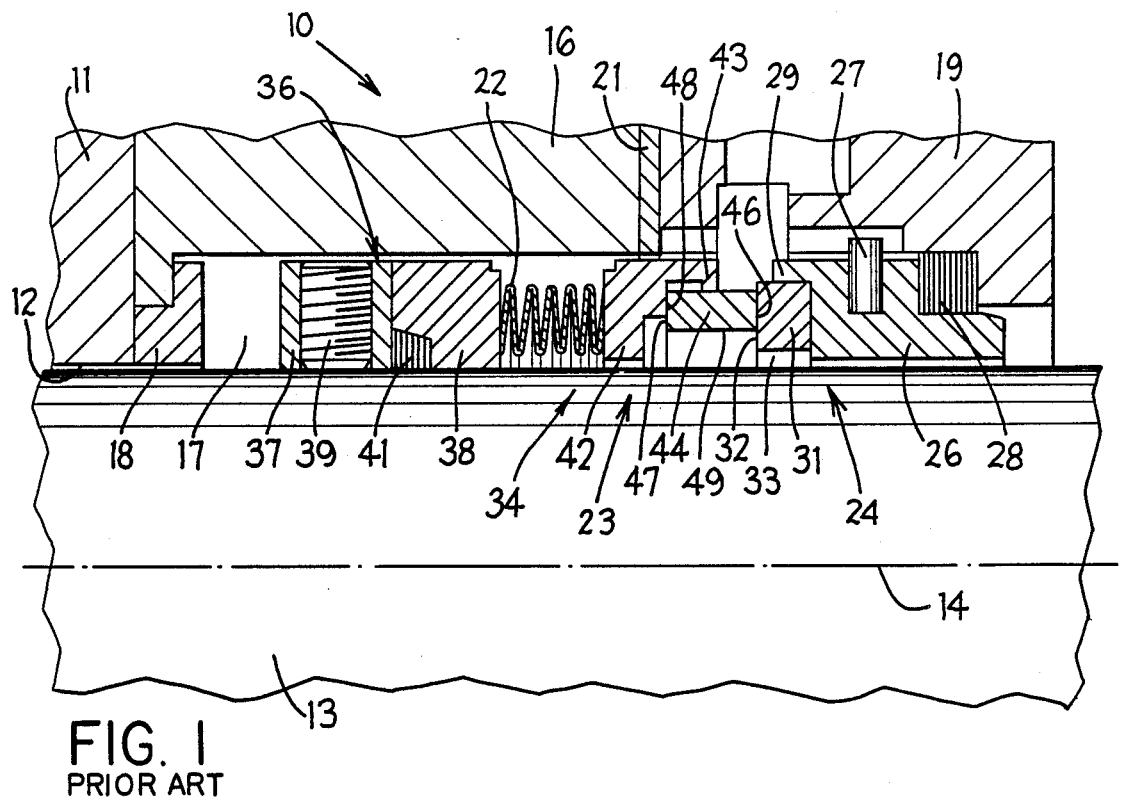
FIG. 1 is a fragmentary axial sectional view of a conventional bellows-type mechanical seal assembly.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the seal construction and designated parts thereof. Said terminology will include the words specifically mentioned, derivatives thereof, and words of similar import.

DETAILED DESCRIPTION

FIG. 1 illustrates a conventional bellows-type mechanical shaft seal construction 10 associated with an apparatus which includes a wall 11 having an opening 12 through which extends a shaft 13 rotatable about its axis 14. The wall 11 may be part of any conventional fluid handling device, such as a pump, whereby pressurized fluid is thus present within the apparatus and tends to escape through the opening 12.

To prevent escape of fluid, the seal arrangement 10 is provided for creating a sealed relationship between wall 11 and shaft 13. For this purpose, the seal arrangement 10 includes a conventional annular stuffing box or housing 16 secured to the wall 11 in surrounding relationship to the shaft. The stuffing box defines an annular chamber 17 which communicates with the opening 12. A conventional throat bushing 18 is normally associated with the end of this chamber 17 for restricting flow of pressure fluid through the opening into the chamber.

A further annular housing element 19, commonly referred to as a gland, is positioned directly adjacent the stuffing box 16 and is suitably sealed thereto, as by an intermediate gasket 21. A plurality of conventional threaded fastener elements (not shown) are used for fixedly interconnecting the stuffing box 16 and gland 19 to the wall 11.

An "inside" type of mechanical seal assembly 23 is disposed within the annular chamber 17 for creating a sealed relationship between the shaft 13 and the gland 19, while permitting relative rotation therebetween. The mechanical seal assembly 23 is of the bellows type and includes a stationary seal portion 24 which is nonrotatably connected to the gland 19. This portion 24 includes an annular seal member 26 (commonly referred to as a gland insert) which is nonrotatably connected to the gland 19 by a suitable key or pin 27. A sealing ring or gasket 28 is provided between the gland 19 and the insert 26.

Insert 26 has an annular flange 29 which projects axially from the inner end thereof, which flange snugly and supportingly embraces (by means of an interference or press fit) an annular face ring 31, which latter ring defines a flat annular seal face 32 on the outer or exposed axial end thereof. A suitable annular clearance 33 exists between the insert 26 and the shaft 14 to permit unrestricted relative rotation and angular or lateral movement or deflection of the shaft relative to the surrounding housing.

The mechanical seal assembly 23 also includes a rotatable seal portion 34. This latter portion 34 includes an annular collar 36 formed by first and second ring-like collar members 37 and 38, respectively, which are fixedly connected by suitable screws or the like. The collar is fixed to the shaft 13 by any conventional means, such as a set screw 39. A suitable seal ring or gasket 41 is clampingly sealed between the two collars to create a sealed engagement with the periphery of the shaft 13.

Rotary seal portion 34 also includes a rotatable annular seal ring 42 which surrounds the shaft 13 and has an inner diameter which is substantial larger than the shaft 13 to permit relative lateral and/or angular movement therebetween. The seal ring 42 has an annular flange 43 which projects axially from the outer end thereof, which flange defines a recess in which is positioned an annular face ring 44, the latter being fixedly mounted and supported on the seal ring by means of a press or interference fit within the flange 43. The face ring 44 defines a transverse or radial seal face 46 on the outer axial end thereof, which face 46 is urged into rotatable slidable engagement with the opposed seal face 32. The rear face 47 of the face ring 44 is seated against a bottom surface 48 as defined on the seal ring 42.

The seal assembly 23 also includes a conventional metal bellows seal 22 which extends between the collar 36 and the seal ring 42 for nonrotatably and sealingly joining same together. This bellows seal 22 encircles the shaft and has one end thereof fixedly and sealingly connected, as by welding, to the collar 38. The other end of bellows seal 22 is fixedly and sealingly connected, as by welding, to the seal ring 42. The bellows seal 22 is of substantially conventional construction and includes a plurality of individual bellows plates, preferably of stainless steel, suitably welded together.

The bellows seal 22 also functions as a resilient device for normally resiliently urging the seal ring 42 toward the gland insert 26, thereby maintaining the seal faces 32 and 46 in sealing engagement with one another. Additional resilient can be provided, if necessary, by utilization of one or more conventional coil springs positioned for cooperation between the collar 38 and the seal ring 42.

The face rings 31 and 44 are construction of carbide, such as tungsten carbide or silicon carbide. The rotating face ring 44 generally has an axial extent which exceeds its radial thickness, and the inner diameter of the ring 44 as defined by the cylindrical inner wall 49 is substantially larger than the diameter of shaft 13 so that wall 49 is spaced radially a substantial distance from the shaft.

The overall seal construction illustrated in FIG. 1, including the structure and operation thereof, is conventional. Reference is made to U.S. Pat. Nos. 4,261,581 and 3,773,337 wherein this type of arrangement is described in greater detail.

Figure 2:
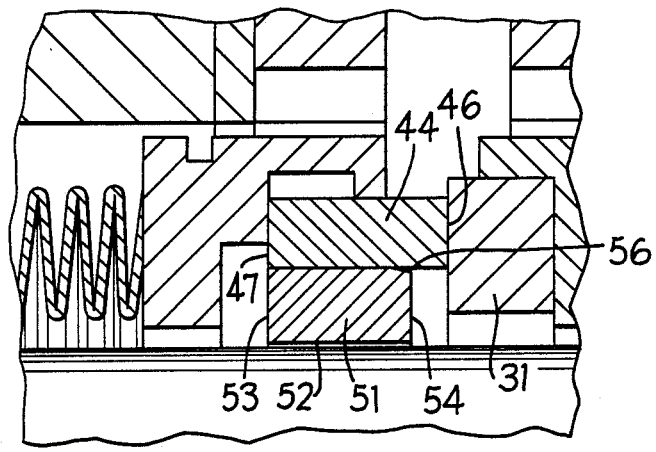
FIG. 2 is an enlarged fragmentary axial sectional view according to the present invention.

Considering now the improvement according to the present invention and referring to FIG. 2, the rotating carbide face ring 44 is provided with a vibration dampening ring 51 fixedly positioned therein. This ring 51 is disposed within the inner cylindrical wall 49 of the carbide face ring 44 by means of an interference or press fit so that the rings 44 and 51 are fixedly joined together. The vibration dampening ring 51 has an inner diameter or cylindrical wall 52 which is only slightly larger than the outer diameter of the shaft 13, thereby providing a diametral clearance therebetween in the range from about 0.005 inch to about 0.025 inch.

The dampening ring 51 is preferably constructed of carbon and, as shown by FIG. 2, is of significant axial length. In fact, the ring 51 has a length which equals a substantial majority of, but is slightly less than the maximum axial length of the carbide face ring 44. The carbon ring 51 has a rear face 53 which is preferably disposed substantially flush with the rear face 47 of the carbide face ring. The front face 54 of the ring 51, however, is spaced axially rearwardly or inwardly from the seal face 46 so as to prevent any buildup of debris or coke on the carbon ring from interfering with the seal face 46.

The ring 51, on the outer diameter thereof adjacent the front face 54, is provided with a small chamfer 56 on the corner thereof to facilitate the pressing of the carbon ring 51 into the carbide ring 44 from the leftward side of the latter. The face 54 of ring 51 is preferably disposed axially rearwardly from the seal face 46 by at least about 0.006 inch.

The carbon ring 51 always has an axial length which is greater than its radial thickness. For example, the dimensions of this carbon ring may range from an outer diameter of about 1.20 inch having a radial thickness of about 0.25 inch and an axial length of about 0.30 inch, to an outer diameter of about 4.78 inch having a radial thickness of about 0.40 and an axial length of about 0.50 inch.

In operation, the improved mechanical seal construction illustrated by FIG. 2 utilizing the carbon vibration dampening ring 51 is able to significantly minimize and control vibration of the seal construction, particularly the severe bellows vibration which has been observed to develop in situations where a mechanical seal is permitted to run under a dry condition. At the same time, the carbon ring 51 is able to retain sufficient radial clearance as to not interfere or restrict the necessary radial displacement or angular tilting of the face ring 44 so as to enable it to always maintain a desired running conformance and sealed engagement with the stationary face ring 31. The ring 51 itself is somewhat self-lubricating which, when coupled with its significant axial length, prevents it from fretting the shaft or hanging up. Except for the significant improvement achieved with respect to eliminating or minimizing vibrational effects, the seal construction otherwise operates in a conventional manner.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mechanical seal construction for sealing a shaft which is relatively rotatable with respect to a houring, said seal construction having collar means surrounding and nonrotatably fixed to said shaft, a rotary seal portion disposed in surrounding relationship to the shaft and including a rotary support ring and a rotary carbide face ring fixed to said support ring, said rotary support and face rings being radially spaced from said shaft to define a substantial annular clearance therebetween, an axially elongate metal bellows disposed in surrounding relationship to said shaft and extending axially between said collar means and said rotary support ring, said bellows means having one end thereof fixedly anchored to said collar means and the other end thereof fixedly anchored to said rotary support ring, and a stationary seal portion including a gland ring fixed relative to said housing and a stationary carbide face ring fixed to said gland ring, said gland and stationary face rings being disposed in surrounding relationship to said shaft and spaced radially therefrom by substantial annular clearance spaces therebetween, said rotary and stationary face rings defining thereon axially opposed and generally planar seal faces which are maintained in relatively rotatable sliding engagement with one another to create a seal radially thereacross, comprising the improvement wherein a vibration dampening ring is concentrically disposed within said rotary face ring in surrounding relationship to said shaft, said vibration dampening ring being constructed of carbon and fixedly secured within said rotary face ring by means of an interference or press fit therebetween, said vibration dampening ring having an inner diameter which is only slightly larger than the outer diameter of said shaft to define a small radial clearance therebetween, said vibration dampening ring being of substantial axial extent to function as a vibration damper.

2. A seal construction according to claim 1, wherein said vibration dampening ring has an axial length at least about 75 percent of the axial length of said rotary face ring, said vibration dampening ring having an axial length less than that of said rotary face ring.

3. A seal construction according to claim 2, wherein said vibration dampening ring has a front axial end face on one end thereof which faces axially in the same direction as the seal face on said rotary face ring, and wherein the front axial face on said vibration dampening ring is spaced axially rearwardly from the seal face on said rotary face ring.

4. A seal construction according to claim 3, wherein said vibration dampening ring has a radial thickness which is in the range of about 60 to about 80 percent of its axial length.

5. A seal construction according to claim 4, wherein the diametrical clearance between said shaft and said vibration dampening ring is in the range of between about 0.005 and about 0.025 inch.

* * * * *

UNITED STATES PATENT AND TRADEMARK OFFICE
CERTIFICATE OF CORRECTION

PATENT NO. : 4 890 851

DATED : January 2, 1990

INVENTOR(S) : Louis H. Avard et al

It is certified that error appears in the above-identified patent and that said Letters Patent is hereby corrected as shown below:

Column 6, line 15; change "houring" to ---housing---.

Signed and Sealed this

Fourth Day of December, 1990

*Attest:*

HARRY F. MANBECK, JR.

*Attesting Officer*  *Commissioner of Patents and Trademarks*